United States Patent
Neuman et al.

(10) Patent No.: US 7,419,725 B2
(45) Date of Patent: *Sep. 2, 2008

(54) COATED ARTICLE WITH LOW-E COATING INCLUDING IR REFLECTING LAYER(S) AND CORRESPONDING METHOD

(75) Inventors: George Neuman, Ann Arbor, MI (US); Jose Ferreira, Rumelange (LU); Jean-Marc Lemmer, Lorentzweiler (LU)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg ( * ) Notice: Subject to any disclaimer, the term of this patent is extended or adjusted under 35 U.S.C. 154(b) by 180 days.

This patent is subject to a terminal disclaimer.

(21) Appl. No.: 10/980,805

(22) Filed: Nov. 4, 2004

(65) Prior Publication Data

US 2006/0046073 A1   Mar. 2, 2006

Related U.S. Application Data

(63) Continuation-in-part of application No. 10/931,212, filed on Sep. 1, 2004.

(60) Provisional application No. 60/607,261, filed on Sep. 7, 2004.

(51) Int. Cl.
*B32B 17/07* (2006.01)

(52) U.S. Cl. .................. 428/432; 428/697; 428/698; 428/699; 428/701; 428/702; 428/704

(58) Field of Classification Search ............... 428/428, 428/432, 433, 434, 697, 698, 699, 701, 702, 428/704
See application file for complete search history.

(56) References Cited

U.S. PATENT DOCUMENTS

| 5,425,861 A | 6/1995 | Hartig et al. |
| 5,514,476 A | 5/1996 | Hartig et al. |
| 5,552,180 A | 9/1996 | Finley et al. |
| 5,557,462 A | 9/1996 | Hartig et al. |
| 5,595,825 A | 1/1997 | Guiselin |
| 5,770,321 A | 6/1998 | Hartig et al. |
| 5,800,933 A | 9/1998 | Hartig et al. |
| 5,837,108 A | 11/1998 | Lingle et al. |

(Continued)

OTHER PUBLICATIONS

U.S. Appl. No. 10/931,212, filed Sep. 1, 2004.

*Primary Examiner*—Gwendolyn Blackwell
(74) *Attorney, Agent, or Firm*—Nixon & Vanderhye P.C.

(57) ABSTRACT

A coated article is provided with a low-emissivity (low-E) layer stack for use in a window unit or the like. The layer stack, or coating, may permit the coated article to achieve one or more of a low solar factor (SF) value, a high selectivity ($T_{vis}$/SF) value, substantially neutral color at normal and/or off-axis viewing angles, and/or low emissivity. When high selectivity values are achieved, there is provided a high ratio of visible transmission to SF, which is a desirable feature in certain example instances. In certain example embodiments, asymmetric IR reflecting layer thicknesses may be used (e.g., bottom IR reflecting layer thicker than the top IR reflecting layer), and/or different contact layer for the top/bottom IR reflecting layers may be used to help achieve a combination of low SF values, high selectivity, and good coloration at normal and/or off-axis viewing angles.

58 Claims, 2 Drawing Sheets

U.S. PATENT DOCUMENTS

| | | |
|---|---|---|
| 5,837,361 A | 11/1998 | Glaser et al. |
| 5,948,538 A | 9/1999 | Brochot et al. |
| 5,993,950 A * | 11/1999 | Novis et al. ............ 428/216 |
| 6,014,872 A | 1/2000 | Hartig et al. |
| 6,132,881 A | 10/2000 | Hartig et al. |
| 6,576,349 B2 * | 6/2003 | Lingle et al. ............ 428/610 |
| 6,673,427 B2 | 1/2004 | Guiselin et al. |
| 6,686,050 B2 | 2/2004 | Lingle et al. |
| 6,692,831 B2 | 2/2004 | Stachowiak |
| 2002/0031674 A1 | 3/2002 | Laird |
| 2003/0150711 A1 | 8/2003 | Laird |
| 2005/0123772 A1 | 6/2005 | Coustet et al. |

* cited by examiner

COATED ARTICLE WITH LOW-E COATING INCLUDING IR REFLECTING LAYER(S) AND CORRESPONDING METHOD

This application claims priority on U.S. Provisional Application No. 60/607,261, filed Sep. 7, 2004, and this application is also a Continuation-in-Part (CIP) of U.S. patent application Ser. No. 10/931,212, filed Sep. 1, 2004, and entitled "Coated Article with Low-E Coating Including IR Reflecting Layer(s) and Corresponding Method", the disclosures of which are both hereby incorporated herein by reference.

This invention relates to a coated article including a low-E coating, and/or methods of making the same. Coated articles according to certain example embodiments of this invention may be used in the context of insulating glass (IG) window units, other types of windows, or in any other suitable application.

BACKGROUND OF THE INVENTION

Coated articles are known in the art for use in window applications such as insulating glass (IG) window units, vehicle windows, and/or the like. In certain situations, designers of coated articles often strive for a combination of high visible transmission, substantially neutral color, low emissivity (or emittance), and blockage of undesirable radiation such as infrared (IR) radiation to prevent undesirable heating of a building interior or the like. High visible transmission for example may permit coated articles to be more desirable in certain window applications, whereas low-emissivity (low-E), low SHGC (solar heat gain coefficient), and low SF (solar factor, or g-value) characteristics permit coated articles to block significant amounts of undesirable radiation so as to reduce, for example, undesirable heating of vehicle or building interiors.

Solar factor (SF, or g-value), calculated in accordance with DIN standard 67507, relates to a ratio between the total energy entering a room or the like through a glazing and the incident solar energy. Thus, it will be appreciated that low SF values are indicative of good solar protection against undesirable heating of rooms or the like protected by windows/glazings. For example, a low SF value is indicative of a coated article (e.g., IG unit such as a double glazing) that is capable of keeping a room fairly cool in summertime months during hot ambient conditions.

While low SF values are typically desirable for coated articles such as IG window units, the achievement of low SF values typically comes at the expense of visible transmission and/or coloration. It is often desirable, but very difficult, to achieve a combination of a high visible transmission and a low SF value for a coated article such as an IG window unit or the like. In this regard, the ratio between visible transmission ($T_{vis}$) and SF is sometimes referred to as "selectivity." In other words, the "selectivity" of a coated article is defined by $T_{vis}$/SF.

High selectivity ($T_{vis}$/SF) values are indicative of a combination of high visible transmission and low SF, and are thus often desirable. Unfortunately, high selectivity ($T_{vis}$/SF) values have heretofore been difficult to achieve in certain situations.

For example, an object of glazings described in U.S. Pat. No. 6,673,427 to Guiselin is to achieve the "highest possible" selectivity (i.e., $T_{vis}$/SF). In this regard, see the '427 Patent at column 1, lines 54-60. Given this goal of achieving the highest possible selectivity (i.e., $T_{vis}$/SF), glazings according to the '427 Patent were able to achieve a selectivity of about 1.6 to 1.7 in a double glazing (see the '427 Patent at column 7, lines 3-5). In particular, Example 3 of the '427 Patent achieved a selectivity of about 1.67 whereas Example 4 of the '427 Patent achieved a selectivity of about 1.61 as evidenced by Table 2 of the '427 Patent (e.g., for Example 4, 61/38=1.605).

While higher selectivities are sometimes achievable, they have come at the expense of higher SF values and/or undesirable coloration at normal and/or off-normal viewing angles such as 45 degrees. For example, Examples 1 and 2 of U.S. Pat. No. 5,595,825 to Guiselin used triple-silver coatings to allegedly achieve selectivity values in double glazings of 1.97 and 1.82, respectively. However, the coatings of the '825 Patent required the use of three separate silver layers at particular thicknesses to achieve such selectivity values, at the expense of higher SF values of 30 and 34 respectively. Such high SF values may sometimes be undesirable in certain example non-limiting instances since they are indicative of coatings that in certain situations cannot block sufficient radiation from reaching a building or vehicle interior. Too, in certain example instances, the requirement of three separate silver layers may be undesirable in certain example non-limiting situations in that such coatings are more costly and burdensome to manufacture and may be more susceptible to yield problems. Furthermore, it is unclear from the '825 Patent whether the coatings thereof realize significant color shifts upon change in viewing angle and/or undesirable coloration.

U.S. 2003/0150711 to Laird, the disclosure of which is hereby incorporated herein by reference, discloses a coating having the following layers oriented from the glass substrate outwardly:

| Glass Substrate | Thickness (Å) |
| --- | --- |
| $TiO_2$ | 200 |
| ZnO | 90 |
| Ag | 130 |
| $NiCrO_x$ | 30 |
| $SnO_2$ | 680 |
| ZnO | 90 |
| Ag | 168 |
| $NiCrO_x$ | 30 |
| $SnO_2$ | 125 |
| $Si_3N_4$ | 220 |

While the aforesaid coated article of U.S. 2003/0150711 achieves excellent results in many respects, when used in the context of an IG window unit (or double glazing), it typically achieves a selectivity ($T_{vis}$/SF) of about 1.7 or so. Higher selectivity values are often desirable in certain example non-limiting situations.

One approach in the art to improving color at high viewing angles in double-silver coatings (i.e., coatings with a pair of silver layers) is to make the top silver layer significantly thicker than the bottom silver layer. For example, see U.S. Pat. No. 6,673,427 to Guiselin, discussed above. A goal of such coatings is to prevent a color shift from blue-green to red with a change in viewing angle. Such color changes to red are easily picked up by observers and are sometimes considered to be objectionable. However, such designs may sometimes suffer due to their need to position the NIR reflectance increase well outside the visible spectra from a limitation with respect to the SHGC (or SF) achievable. In other words, due to the need to position the NIR reflectance increase well outside the visible spectra in such coatings in order to prevent a color shift to red at angle, low SF and/or SHGC values are not easily achievable for a given visible transmittance (the same may apply for maximum Light to Solar Gain—LSG—ratio) in certain example non-limiting coatings where the top silver layer is significantly thicker than the bottom silver layer as in the '427 Patent. Note the SF values of 38-42 in Examples 1-8 of the '427 Patent, which in certain example non-limiting situations are rather high.

In view of the above, it will be apparent to those skilled in the art that there exists a need for coated articles which are capable of providing one or more of high selectivity values, low SF values, substantially neutral color at normal and/or off-axis viewing angles, and/or low emissivity (or emittance).

BRIEF SUMMARY OF EXAMPLE EMBODIMENTS OF THE INVENTION

In certain example embodiments of this invention, a coated article is provided with a layer stack which may permit the coated article to achieve one or more of high selectivity values, low solar factor (SF) values, substantially neutral color at normal and/or off-axis viewing angles, and/or low emissivity. When high selectivity ($T_{vis}$/SF) values are achieved, there is provided a high ratio of visible transmission to solar factor (SF), which will be appreciated by those skilled in the art. Coated articles according to certain example embodiments of this invention may be, or may be used in, IG window units, monolithic windows, or other types of windows.

In certain example embodiments of this invention, a coated article is provided which has both high selectivity and desirable coloration at both normal and off-axis viewing angles such as 45 degrees from normal. Moreover, in certain example embodiments, the coloration of the coated article does not shift by more than a predetermined amount between a normal viewing angle and an off-axis viewing angle of 45 degrees for example.

In certain example embodiments of this invention, a coated article such as an IG window unit realizes a selectivity value ($T_{vis}$/SF) of at least 1.75, more preferably of at least 1.80, even more preferably of at least 1.85, sometimes at least 1.90, and in certain instances at least 1.95.

In certain example embodiments of this invention, high selectivity is achieved without sacrificing SF values. In other words, high selectivity values are achieved in combination with rather low SF values. Thus, in certain example embodiments of this invention, coated articles realize a high selectivity value, in combination with a SF of no greater than 27.5, and more preferably a SF of no greater than about 27.0, even more preferably a SF of no greater than about 26.5, even more preferably a SF of no greater than about 26.0, and sometimes a SF value of no greater than about 25.0. This permits coated articles, for example, to realize good selectivity while at the same time blocking significant undesirable radiation from reaching a building interior or the like.

In certain example embodiments of this invention, coated articles realize a visible transmission of from about 35 to 65%, more preferably from about 40 to 60%, even more preferably from about 45 to 55%, and most preferably from about 48 to 52% in a monolithic and/or IG unit context.

In certain example embodiments of this invention, the low-E coating of a coated article includes only two IR reflecting layers (e.g., only two silver or silver-based layers). While other numbers of IR reflecting layers may sometimes be provided, the use of two is preferable in certain instances in that more such layers are not required thereby making coatings easier and cost effective to manufacture and less susceptible to yield problems.

In certain example embodiments of this invention, a coated article is provided with first and second infrared (IR) reflecting layers of or including a material such as silver (Ag), gold, or the like. In certain example non-limiting embodiments, the bottom IR reflecting layer is designed to have a thickness greater than that of the top IR reflecting layer. For example, in certain example embodiments, the ratio ($T_{bottom}/T_{top}$) of the thickness of the bottom IR reflecting layer ($T_{bottom}$) to the thickness of the top IR reflecting layer ($T_{top}$) is at least 1.05, more preferably at least 1.10, even more preferably at least 1.15, and most preferably at least 1.17. Surprisingly, in certain example embodiments, it has been found that providing such a ratio ($T_{bottom}/T_{top}$) advantageously permits good off-axis coloration to be achieved in combination with good selectivity, and without sacrificing SF, SHGC and/or LSG.

In certain example embodiments of this invention, there is provided an insulating glass (IG) window unit including first and second glass substrates, and a coating supported by one of the substrates, the coating comprising: first and second layers comprising silver with at least one dielectric layer therebetween, the first layer comprising silver being located between the glass substrate supporting the coating and the second layer comprising silver; wherein a ratio ($T_{first}/T_{second}$) of the thickness of the first layer comprising silver to the thickness of the second layer comprising silver is at least 1.05; and wherein the IG window unit has a selectivity ($T_{vis}$/SF) of at least 1.75, and/or a solar factor (SF) of no greater than (or less than or equal to) 27.5.

In other example embodiments of this invention, there is provided a insulating glass (IG) window unit comprising: first and second glass substrates, and a coating supported by one of the substrates, the coating comprising: first and second IR reflecting layers with at least one dielectric layer therebetween, the first IR reflecting layer being located between the glass substrate supporting the coating and the second IR reflecting layer; a first contact layer located under and contacting the first IR reflecting layer, a second contact layer located over and contacting the first IR reflecting layer, a third contact layer located under and contacting the second IR reflecting layer, and a fourth contact layer located over and contacting the second IR reflecting layer; wherein the third and/or fourth contact layer is more oxidized than is the first and/or second contact layer; and wherein the IG window unit has a selectivity ($T_{vis}$/SF) of at least 1.75, and/or a solar factor (SF) of no greater than 27.5.

In still further example embodiments of this invention, there is provided a insulating glass (IG) window unit including first and second glass substrates, and a coating supported by one of the substrates, the coating comprising first and second IR reflecting layers with at least one dielectric layer therebetween, wherein the IG window unit has a selectivity ($T_{vis}$/SF) of at least 1.75, and/or a solar factor (SF) of no greater than 27.5.

In other example embodiments of this invention, there is provided a coated article including a coated supported by the glass substrate, the coating comprising first and second IR reflecting layers with at least one dielectric layer therebetween, and wherein the coated article is characterized by one or both of: a) a selectivity ($T_{vis}$/SF) of at least 1.80, in combination with a solar factor (SF) of no greater than 27.5; and/or b) a ratio ($T_{first}/T_{second}$) of the thickness of the first IR reflecting layer to the thickness of the second IR reflecting layer being at least 1.05.

DETAILED DESCRIPTION OF EXAMPLES OF THE INVENTION

Figure 1:
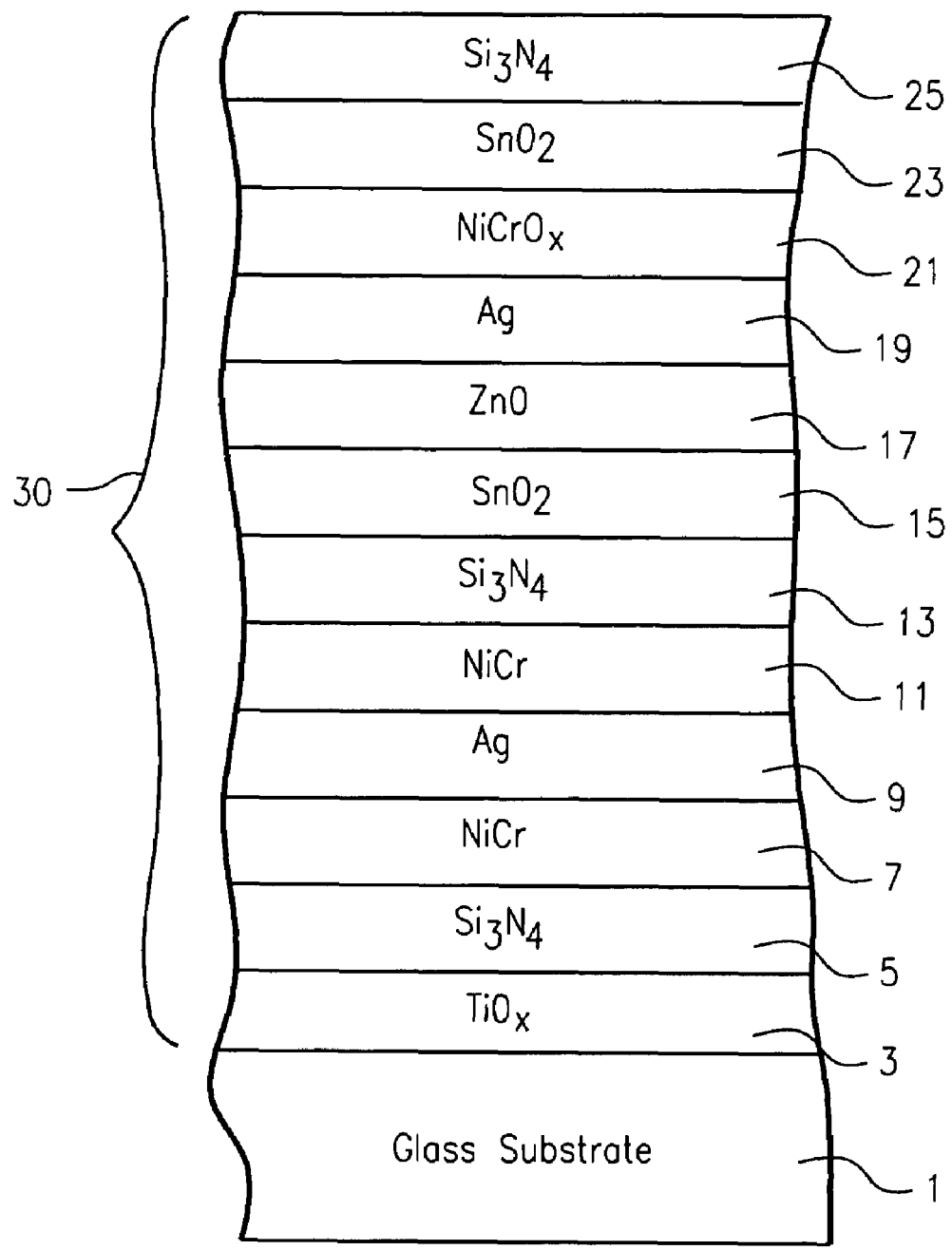
FIG. 1 is a cross sectional view of a coated article according to an example embodiment of this invention.

Referring now more particularly to the accompanying drawings in which like reference numerals indicate like parts throughout the several views.

Coated articles herein may be used in applications such as IG window units (which may include two or more glass substrates with a space therebetween), monolithic windows, and/or any other suitable application that includes single or multiple glass substrates for a window or the like. In certain example embodiments of this invention, the coating includes a double-silver stack (i.e., two layers each of which comprises or is composed of silver), although this invention is not so limited in all instances.

In certain example embodiments of this invention, a coated article is provided with a layer stack which may permit the coated article to achieve one or more of high selectivity ($T_{vis}$/SF), a low solar factor (SF), substantially neutral color at normal and/or off-axis viewing angles, and/or low emissivity. One, two, three, or all of these features may be achieved in different embodiments of this invention. When high selectivity ($T_{vis}$/SF) is achieved, there is provided a high ratio of visible transmission ($T_{vis}$) to solar factor (SF), which will be appreciated by those skilled in the art.

In certain example embodiments of this invention, a coated article is provided which has both high selectivity and desirable coloration at both normal and off-axis viewing angles such as 45 degrees from normal. Moreover, in certain example embodiments, the coloration of the coated article does not shift by more than a predetermined amount between a normal viewing angle and an off-axis viewing angle of 45 degrees for example.

In certain example embodiments of this invention, a coated article such as an IG window unit realizes a selectivity value ($T_{vis}$/SF) of at least 1.75, more preferably of at least 1.80, even more preferably of at least 1.85, sometimes at least 1.90, and in certain instances at least 1.95. In certain example embodiments of this invention, high selectivity is achieved without sacrificing SF values. In other words, high selectivity values are achieved in combination with rather low SF values. In certain example embodiments of this invention, coated articles realize a high selectivity value, in combination with a SF of no greater than 27.5, and more preferably a SF of no greater than about 27.0, even more preferably a SF of no greater than about 26.5, even more preferably a SF of no greater than about 26.0, and sometimes a SF value of no greater than about 25.0. This permits coated articles, for example, to realize good selectivity while at the same time blocking significant undesirable radiation from reaching a building interior or the like.

In certain example embodiments of this invention, coated articles realize a visible transmission of from about 40 to 60%, more preferably from about 45 to 55%, and most preferably from about 48 to 52% in a monolithic and/or IG unit context. While these transmission amounts are preferred in certain example embodiments, other transmissions may of course be used in other instances.

Sheet resistance ($R_s$) is indicative of emissivity or emittance. Low sheet resistance is achieved in certain example embodiments of this invention. In certain example embodiments of this invention, a coated article realizes a sheet resistance ($R_s$) of no greater than about 3.0 ohms/square, more preferably no greater than about 2.0 ohms/square, and most preferably no greater than about 1.9 ohms/square before any optional heat treatment such as tempering. Such low sheet resistance values are indicative of low emissivity.

In certain example embodiments of this invention, the low-E coating of a coated article includes only two IR reflecting layers (e.g., only two silver or silver-based layers) (9 and 19). While other numbers of IR reflecting layers may sometimes be provided, the use of two is preferable in certain instances in that low-emittance can be achieved and more such layers are not required thereby making coatings easier and cost effective to manufacture and less susceptible to yield problems.

In certain example embodiments of this invention, a coated article is provided with first and second infrared (IR) reflecting layers (9, 19) of or including a material such as silver (Ag), gold, or the like. In certain example non-limiting embodiments, the bottom IR reflecting layer (9) is designed to have a thickness greater than that of the top IR reflecting layer (19). For example, in certain example embodiments, the ratio ($T_{bottom}/T_{top}$) [or $T_{first}/T_{second}$] of the thickness of the bottom IR reflecting layer (9) ($T_{bottom}$) to the thickness of the top IR reflecting layer (19) ($T_{top}$) is at least 1.05, more preferably at least 1.10, even more preferably at least 1.15, and most preferably at least 1.17. Surprisingly, in certain example embodiments, it has been found that providing such a ratio ($T_{bottom}/T_{top}$) advantageously permits good off-axis coloration to be achieved in combination with good selectivity, and without sacrificing SF, SHGC and/or LSG.

In certain example embodiments of this invention, the coating is designed so as to have a hump in the glass side reflectance spectra at wavelengths proximate 500 to 560 nm (in a greenish area). Due to this hump, when the spectra shifts at angle the hump creates a green reflective color which counterbalances against red color which comes from long wavelengths upon angle shift (e.g., to a 45 degree viewing angle). Thus, off-axis viewing color can be improved. Stated another way, color stability at angle can be achieved and/or improved, while allowing better selectivity by permitting the reflectance increase at the end of the red part of the spectra to happen at shorter wavelengths.

In certain example embodiments of this invention, the aforesaid advantageous results may be achieved by using different types of contact layers for the top and bottom IR reflecting layers (e.g., silver based layers) (9 and 19). For example, in certain example embodiments of this invention, one or both of the contact layers (17 and/or 21) for the top IR reflecting layer (19) are oxided as deposited, whereas one or both of the contact layers (7 and/or 11) for the bottom IR reflecting layer (9) are metallic or substantially metallic as deposited. This may or may not be done in combination with the ratios ($T_{bottom}/T_{top}$) discussed above.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 7.0 mm thick), and coating (or layer system) 30 provided on the substrate 1 either directly or indirectly. The coating (or layer system) 30 includes: an optional dielectric titanium oxide layer 3 which may be $TiO_x$ (e.g., where x is from 1.5 to 2.0) (or other dielectric material with an index of from about 1.45 to 3.0), dielectric layer 5 of a material such as silicon nitride (e.g., $Si_3N_4$ or any other suitable stoichiometry), first lower contact layer 7 (which contacts IR reflecting layer 9), first conductive and preferably metallic infrared (IR) reflecting layer 9, first upper contact layer 11 (which contacts layer 9), dielectric layer 13 of a material such as silicon nitride (e.g., Si$_3$N$_4$ or any other suitable stoichiometry), dielectric layer 15 of a material such as a metal oxide like tin oxide (which may be deposited in one or multiple steps in different embodiments of this invention) (or other dielectric material with an index from about 1.45 to 3.0, more preferably from about 1.9 to 2.1), second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag, Au or the like). The aforesaid layers 3-25 make up low-E coating 30 that is provided on glass or plastic substrate 1.

Figure 2:
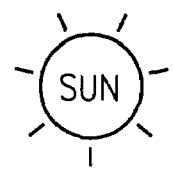
FIG. 2 is a cross section view of an IG unit according to an example embodiment of this invention.
Figure 2:
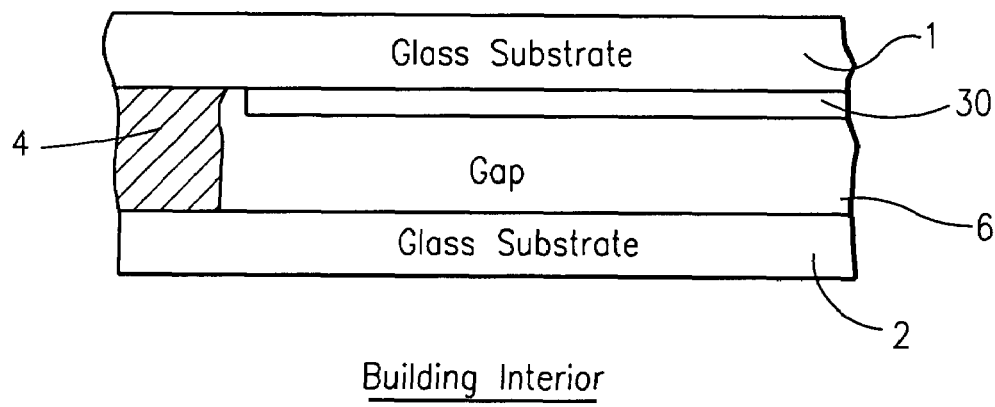

In monolithic instances, the coated article includes only one glass substrate 1 as illustrated in FIG. 1. However, monolithic coated articles herein may be used in devices such as IG window units, or the like. As for IG window units, an IG window unit may include two or more spaced apart glass or plastic substrates. An example IG window unit is illustrated and described, for example, in U.S. Pat. No. 6,632,491, the disclosure of which is hereby incorporated herein by reference. An example IG window unit is also shown in FIG. 2 and may include, for example, the coated glass substrate 1 shown in FIG. 1 coupled to another glass substrate 2 via spacer(s), sealant(s) or the like 4 with a gap 6 being defined therebetween. This gap 6 between the substrates in IG unit embodiments may in certain instances be filled with a gas such as argon (Ar). The gap 6 may or may not be at a pressure less than atmospheric in different embodiments of this invention.

Still referring to FIG. 2, an example IG unit may comprise a pair of spaced apart glass substrates (1 and 2) each about 6 mm thick, one of which is coated with a coating 30 herein in certain example instances, where the gap 6 between the substrates may be from about 5 to 30 mm, more preferably from about IG to 20 mm, and most preferably about 16 mm. In certain example embodiments, the coating 30 is provided on the interior surface of the outer glass substrate 1 as shown in FIG. 2 (i.e., on surface #2 from the outside), although it may be provided on the other substrate 2 in alternative embodiments of this invention.

Dielectric layer 3 may be of or include titanium oxide in certain example embodiments of this invention. This layer is provided for anti-reflective purposes, and preferably has an index of refraction (n) of from about 2.0 to 2.6, more preferably from about 2.2 to 2.5. Layer 3 may be provided in direct contact with the glass substrate 1 in certain example embodiments of this invention, or alternatively other layer(s) may be provided between the substrate 1 and layer 3 in certain instances.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers 9 and/or 19 may, however, be slightly oxidized in certain embodiments of this invention. Furthermore, other material may be used for the IR reflecting layers such as alloys of Ag.

In certain example non-limiting embodiments, the bottom IR reflecting layer 9 is designed to have a thickness greater than that of the top IR reflecting layer 19. For example, in certain example embodiments, the ratio (T$_{bottom}$/T$_{top}$) of the thickness of the bottom IR reflecting layer 9 (T$_{bottom}$) to the thickness of the top IR reflecting layer 9 (T$_{top}$) is at least 1.05, more preferably at least 1.10, even more preferably at least 1.15, and most preferably at least 1.17. Surprisingly, in certain example embodiments, it has been found that providing such a ratio (T$_{bottom}$/T$_{top}$) advantageously permits good off-axis coloration to be achieved in combination with good selectivity, and without sacrificing SF, SHGC and/or LSG. In certain example embodiments of this invention, such a ratio (T$_{bottom}$/T$_{top}$) helps permit the coating or coated article to have a hump in the glass side reflectance spectra at wavelengths proximate 500 to 560 nm (in a greenish area). Due to this hump, when the spectra shifts at angle the hump creates a green reflective color which counter-balances against red color which comes from long wavelengths upon angle shift (e.g., at a 45 degree viewing angle). The aforesaid ratios (T$_{bottom}$/T$_{top}$) in certain example embodiment allow the hump to grow upon an increase in viewing angle, thereby offsetting red reflectance coloration which tends to occur at high viewing angles. Thus, off-axis viewing color can be improved. Stated another way, color stability at angle can be achieved and/or improved, while allowing better selectivity by permitting the reflectance increase at the end of the red part of the spectra to occur at shorter wavelengths. In certain example embodiments of this invention, this may be achieved by using ratios (T$_{bottom}$/T$_{top}$) discussed above, or alternatively which may be approximately 1.0, without having to resort to the silver asymmetry of the aforesaid '427 Patent.

Contact layers 7, 11, and 21 may be of or include nickel (Ni) oxide, chromium/chrome (Cr) oxide, Ni, Cr, NiCr, or a nickel alloy oxide such as nickel chrome oxide (NiCrO$_x$), or other suitable material(s), in certain example embodiments of this invention. The use of, for example, NiCr, NiCrO$_x$ and/or NiCrN$_x$ in these layers (7, 11, and/or 21) allows durability to be improved. These contact layers may or may not be continuous in different embodiments of this invention across the entire IR reflecting layer. Moreover, one or more of the contact layers may be of or include zinc oxide in certain example embodiments of this invention (e.g., see layer 17 in FIG. 1).

In certain example embodiments of this invention, the aforesaid advantageous improved selectivity (or improved selectivity T$_{vis}$/SF, in combination with low SF) may achieved by using different types of contact layers for the top and bottom IR reflecting layers 9 and 19 (e.g., silver based layers). For example, in certain example embodiments of this invention, one or both of the contact layers 17 and/or 21 for the top IR reflecting layer 9 are oxided as deposited, whereas one or both of the contact layers 7 and/or 11 for the bottom IR reflecting layer 9 are metallic or substantially metallic as deposited. Alternatively, in certain example embodiments of this invention, one or both of the contact layers 17 and/or 21 for the top IR reflecting layer 9 are substantially more oxided than one or both of the contact layers 7 and/or 11 for the bottom IR reflecting layer 9. In certain example embodiments, the contact layers for the top IR reflecting layer may be of zinc oxide 17 and/or an oxide of NiCr 21, whereas the contact layers 7 and/or 11 for the bottom IR reflecting layer may be of NiCr. This may or may not be done in combination with the ratios (T$_{bottom}$/T$_{top}$) discussed above.

As explained above, one or more contact layer(s), such as layer 17, may be of or include zinc oxide (e.g., ZnO). The zinc oxide of these layer(s) may contain other materials as well such as Al or other material (e.g., to form ZnAlO$_x$). For example, in certain example embodiments of this invention, one or more of zinc oxide contact layers may be doped with from about 1 to 10% Al, more preferably from about 1 to 5% Al, and most preferably about 2 to 4% Al. The use of zinc oxide under a silver IR reflecting layer allows for an excellent quality of silver to be achieved.

Dielectric layers 5 and 13 may be of or include silicon nitride (e.g., Si$_3$N$_4$) in certain example embodiments of this invention. The silicon nitride may be doped with aluminum (e.g., from 0-10%, more preferably from about 1-10%) in certain example embodiments of this invention. Other materials may instead be used.

Dielectric layers 15 and 23 may be of or include a metal oxide such as tin oxide in certain example embodiments of this invention. However, as with other layers herein, other materials may be used in different instances. Dielectric layer 25, which may be an overcoat including one or more layers in certain example instances, may be of or include silicon nitride (e.g., $Si_3N_4$) or any other suitable material in certain example embodiments of this invention. Optionally, other layers may be provided above layer 25. For example, an overcoat layer of or including zirconium oxide (not shown) may be formed directly on top of the silicon nitride layer 25 in certain example embodiments of this invention. Silicon nitride layer 25 may be doped with Al or the like in certain example embodiments of this invention, as with other silicon nitride layers.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. Thus, the use of the word "on" herein is not limited to being in direct contact with. As another example, a layer of or including silicon nitride may be provided between layers 15 and 17 in certain example embodiments of this invention. As another example, contact layer 7 may be of or comprise zinc oxide in certain example embodiments of this invention.

While various thicknesses and materials may be used in layers in different embodiments of this invention, example thicknesses and materials for respective layers on the glass substrate 1 in the FIG. 1 embodiment are as follows, from the glass substrate outwardly (the silver thicknesses are approximations based on deposition data):

Example Materials/Thicknesses; FIG. 1 Embodiment

| Layer<br>Glass (1-10 mm thick) | Preferred<br>Range (Å) | More<br>Preferred (Å) | Example (Å) |
|---|---|---|---|
| $TiO_x$ (layer 3) | 10-300 Å | 30-100 Å | 60 Å |
| $Si_3N_4$ (layer 5) | 0-400 Å | 100-300 Å | 165 Å |
| NiCr (layer 7) | 8-60 Å | 10-50 Å | 37.5 Å |
| Ag (layer 9) | 50-250 Å | 60-200 Å | 170 Å |
| NiCr (layer 11) | 5-50 Å | 5-40 Å | 7.5 Å |
| $Si_3N_4$ (layer 13) | 10-200 Å | 10-100 Å | 50 Å |
| $SnO_2$ (layer 15) | 10-1,000 Å | 350-850 Å | 615 Å |
| $ZnO_x$ (layer 17) | 10-300 Å | 40-160 Å | 140 Å |
| Ag (layer 19) | 50-250 Å | 80-220 Å | 145 Å |
| $NiCrO_x$ (layer 21) | 10-100 Å | 20-55 Å | 30 Å |
| $SnO_2$ (layer 23) | 0-750 Å | 50-200 Å | 85 Å |
| $Si_3N_4$ (layer 25) | 0-750 Å | 100-320 Å | 270 Å |

Consider a situation where all dielectric layers below the bottom IR reflecting layer are considered a bottom dielectric, all dielectric layers between the two IR reflecting layers are considered a middle dielectric, and all dielectric layers above the top IR reflecting layer are considered a top dielectric. The dielectrics may be one or more layers of oxides, nitrides, or the like in different embodiments of this invention. In certain example embodiments of this invention, the thickness of the middle dielectric is greater than the sum of the bottom and top dielectrics; and the bottom dielectric is thinner than the top dielectric. In certain example embodiments, the two IR reflecting layers have the same thickness, +/−20%, more preferably +/−15%. The sum thickness of the two IR reflecting layers in certain example embodiments is from about 250 to 350 angstroms, more preferably from about 290 to 330 angstroms.

In certain example embodiments of this invention, coated articles herein may have the following optical and solar characteristics when provided in the context of an IG unit. The optics may be measured in accordance with Ill. C, 2 degree observer as is known in the art. In certain embodiments, at least the coated glass substrate is not thermally tempered. An example IG Unit, for purposes of reference only, includes a pair of 6 mm glass substrates (clear and/or green colored) separated by a space of 16 mm, not thermally tempered. The below data was taken at the normal viewing angle, unless otherwise specified (e.g., the $\Delta R_g Y$ data, $\Delta a^*_g$ data (absolute value), and $\Delta b^*_g$ data (absolute value) are indicative in the change in the listed value between the 0 degree viewing angle and a 45 degree viewing angle):

Example Optical Characteristics (IG Unit)

| Characteristic | General | More Preferred | Best |
|---|---|---|---|
| Selectivity ($T_{vis}$/SF): | ≧1.75 | ≧1.85 | ≧1.90 |
| SF (DIN 67507): | ≦27.5 | ≦26.5 | ≦25.0 |
| SHGC: | ≦35 | ≦26.0 | ≦25.0 |
| $T_{vis}$ (or TY)(Ill C, 2 deg.): | 40-60% | 45-55% | 48-52% |
| $a^*_t$: | −8 to +2 | −7.5 to +1 | −7.1 to 0 |
| $b^*_t$: | −2 to +8 | −1 to +4 | 0 to +4 |
| $R_g Y$ (outside refl.): | ≦20% | ≦19% | ≦18% |
| $a^*_g$: | −5 to +2 | −4 to +2 | −2.5 to +1 |
| $b^*_g$: | −15 to +10 | −10 to +4 | −8 to 0 |
| $R_g Y$ (45° VA): | ≦17% | ≦16% | ≦15% |
| $a^*_g$: | −5 to +3 | −3 to +2 | −2.5 to +2 |
| $b^*_g$: | −15 to +10 | −13.0 to +4 | −12 to 0 |
| $\Delta R_g Y$ (shift from 0-45°): | ≦1.5% | ≦1.0% | ≦0.5% |
| $\Delta a^*_g$: | ≦3.5 | ≦2.5 | ≦2.1 |
| $\Delta b^*_g$: | ≦3.5 | ≦2.0 | ≦1.5 |
| $R_s$ (ohms/square): | ≦3.0 | ≦2.0 | ≦1.9 |
| LSG Ratio: | >1.5 | >1.67 | >1.7 |

In certain example embodiments of this invention, coated articles herein may have the following optical and solar characteristics when measured monolithically (e.g., clear glass substrate 6 mm thick, not thermally tempered).

Example Optical Characteristics (Monolithic)

| Characteristic | General | More Preferred | Best |
|---|---|---|---|
| $T_{vis}$ (or TY)(Ill. C, 2 deg.): | 45-65% | 50-60% | 52-59% |
| $a^*_t$: | −9 to +2 | −8 to +1 | −6 to 0 |
| $b^*_t$: | −2 to +10 | −1 to +9 | 0 to +8 |
| $R_g Y$ (glass side refl.): | ≦20% | ≦18% | ≦16.5% |
| $a^*_g$: | −5 to +2 | −3 to +2 | −2 to 0 |
| $b^*_g$: | −20 to +10 | −15 to +3 | −10 to 0 |
| $\Delta R_g Y$ (shift from 0-45°): | ≦1.5% | ≦1.0% | ≦0.5% |
| $\Delta a^*_g$: | ≦3.0 | ≦2.0 | ≦1.5 |
| $\Delta b^*_g$: | ≦3.0 | ≦2.0 | ≦1.0 |
| $R_s$ (ohms/square): | ≦3.0 | ≦2.0 | ≦1.9 |

The following examples are provided for purposes of example only, and are not intended to be limiting unless specifically claimed.

EXAMPLE

The following Example 1 was made via sputtering the coating shown in FIG. 1 on a 6 mm thick clear glass substrates 1 so as to have approximately the layer stack set forth below and shown in FIG. 1. The physical layer thicknesses are approximations, and are in units of angstroms (Å).

| Layer Stack for Example 1 | |
|---|---|
| Layer Glass Substrate | Thickness (Å) |
| $TiO_2$ | 60 |
| $Si_3N_4$ | 165 |
| NiCr | 37.5 |
| Ag | 170 |
| NiCr | 7.5 |
| $Si_3N_4$ | 50 |
| $SnO_2$ | 615 |
| $ZnAlO_x$ | 140 |
| Ag | 145 |
| $NiCrO_x$ | 30 |
| $SnO_2$ | 85 |
| $Si_3N_4$ | 270 |

The Example coated article was not thermally tempered or heat bent in this example. All layers in this particular example were deposited via sputtering. In sputter-depositing the NiCr contact layers 7 and 11, argon (and substantially no oxygen) was used in the sputtering chamber, although some small amount of oxygen is possible in alternative embodiments. In sputtering $NiCrO_x$ contact layer 21, about 470 V and a gas flow of about 250/45 ($Ar/O_2$) was used. Zinc oxide contact layer 17 was sputter-deposited using a ZnAl target using about 218 V and a gas flow of about 350/280 ($Ar/O_2$). Thus, NiCr contact layers 7 and 11 were not intentionally oxidized to any extent and were intended to be metallic, whereas $NiCrO_x$ contact layer 21 was intentionally oxidized to some extent as was zinc oxide contact layer 17. Thus, the contact layers 7 and 11 were formed of material that was more absorbing to light than that of contact layers 17 and 21.

The coated article of Example 1, in monolithic form, had the following characteristics (Ill. C, 2 deg. for visible transmission and reflectance at normal viewing angles) (VA=viewing angle).

| Example 1 (Monolithic) | |
|---|---|
| Characteristic | Example 1 |
| Visible Trans. ($T_{vis}$ or TY): | 53.3% |
| a* | −5.6 |
| b* | 7.2 |
| Glass Side Reflectance (RY): | 16.2% |
| a* | −1.1 |
| b* | −8.5 |
| Glass Side Reflectance (RY) (45° VA): | 16.0% |
| a* | −2.3 |
| b* | −8.3 |
| $\Delta R_gY$ (shift from 0 to 45° VA): | 0.2% |
| $\Delta a^*_g$: | 1.2 |
| $\Delta b^*_g$: | 0.2 |
| Film Side Reflective (FY): | 12.9% |
| a* | −13.8 |

| Example 1 (Monolithic) | |
|---|---|
| Characteristic | Example 1 |
| b* | −14.3 |
| $R_s$ (ohms/square): | 1.78 |

It can be seen from the above that the glass side reflectance changed very little even when the viewing angle (VA) was shifted from 0 to 45 degrees (or a similar shift in incident light). In this respect, see the low $\Delta R_gY$, $\Delta a^*_g$ and $\Delta b^*_g$ values for Example 1 above. Thus, the coated article is advantageous in that it looks similar at many different viewing angles, even though there is some small change in reflective or outside color.

The coated article of Example 1 was then coupled to another glass substrate about 6 mm thick to form an IG window unit as shown in FIG. 2, without being tempered. The gap between the two glass substrates was about 16 mm thick. The IG unit had the following characteristics.

| Example 1 (IG Unit) | |
|---|---|
| Characteristic | Example 1 |
| Selectivity ($T_{vis}$/SF): | 2.02 |
| SF: | 24.4 |
| Visible Trans. ($T_{vis}$ or TY): | 49.4% |
| a* | −7.07 |
| b* | 3.57 |
| Glass Side/Outside Reflectance (RY): | 17.7% |
| a* | −0.73 |
| b* | −7.89 |
| UV Transmittance: | 10.8% |
| $R_s$ (ohms/square): | 1.78 |

Accordingly, it can be seen from the above that the example coated article achieved a combination of: (a) high selectivity ($T_{vis}$/SF), (b) low SF, and (c) color stability upon change in viewing angle from 0 to 45 degrees. This represents a significant improvement in the art. Moreover, the color at normal incidence and up to at least 45 degrees may remain in the blue, or blue-green, part of the a*, b* color space in an IG configuration.

Another example, namely Example 2, was made. Example 2 was similar to Example 1 and had the following characteristics.

| Example 2 (IG Unit) | |
|---|---|
| Characteristic | Example 2 |
| Selectivity ($T_{vis}$/SF): | 1.98 |
| SF: | 25.1 |
| Visible Trans. ($T_{vis}$ or TY): | 49.8% |
| a* | −5.75 |
| b* | 2.97 |
| Glass Side/Outside Reflectance (RY): | 16.9% |
| a* | −1.06 |
| b* | −6.89 |

For purposes of comparison, another Example 3 was simulated so that its silver layers had the same thickness. In particular, Example 3 had the following layer stack (6 mm glass substrate):

Layer Stack for Example 3

| Layer Glass Substrate | Thickness (Å) |
|---|---|
| TiO$_2$ | 136 |
| Si$_3$N$_4$ | 84.7 |
| NiCr | 47.4 |
| Ag | 130 |
| NiCr | 5 |
| Si$_3$N$_4$ | 50 |
| SnO$_2$ | 443 |
| ZnAlO$_x$ | 130 |
| Ag | 130 |
| NiCrO$_x$ | 30 |
| SnO$_2$ | 85 |
| Si$_3$N$_4$ | 165 |

The coated article of Example 3 is compared to that of Example 1 below—note especially the different in the color change upon a change from a 0 to a 45 degree viewing angle (note that the Δ values such as $\Delta a^*_g$ and $\Delta b^*_g$ are calculated in terms of absolute value).

Examples 1 and 3

| Characteristic | Example 1 | Example 3 |
|---|---|---|
| Glass Side Reflectance (RY)(normal VA) | | |
| a* | −1.1 | −0.84 |
| b* | −8.5 | −0.76 |
| Glass Side Reflectance (RY) (45° VA) | | |
| a* | −2.3 | 6.50 |
| b* | −8.3 | −2.70 |
| $\Delta R_g Y$ (shift from 0 to 45° VA) | | |
| $\Delta a^*_g$: | 1.2 | 7.34 |
| $\Delta b^*_g$: | 0.2 | 1.94 |

Thus, it can be seen that Example 3 which used silver layers of the same thickness had a significant glass side reflective a* color shift from 0 to 45 degrees (i.e., $\Delta a^*_g$=7.34). This high $\Delta a^*_g$ value is undesirable in certain example non-limiting instances in that it results in a product which looks much different at different viewing angles.

Optionally, in certain example embodiments, coated articles herein may be heat treated (e.g., thermally tempered). In certain heat treatable embodiments, the center dielectric may include a silicon nitride layer or other oxygen barrier beneath the zinc oxide layer to prevent or reduce oxygen migration during heat treatment. Also, the nickel chrome oxide layer 21 may be a sub-oxide in this or other instances, for heat treatment or otherwise.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An insulating glass (IG) window unit including first and second glass substrates, and a coating supported by one of the substrates, the coating comprising:
   first and second layers comprising silver with at least one dielectric layer therebetween, the first layer comprising silver being located between the glass substrate supporting the coating and the second layer comprising silver;
   wherein a ratio ($T_{first}/T_{second}$) of the thickness of the first layer comprising silver to the thickness of the second layer comprising silver is at least 1.05; and
   wherein the IG window unit has a selectivity ($T_{vis}$/SF) of at least 1.75, and/or a solar factor (SF) of no greater than 27.5.

2. The IG window unit of claim 1, wherein the ratio of the thickness of the first layer comprising silver to the thickness of the second layer comprising silver is at least 1.10.

3. The IG window unit of claim 1, wherein the ratio of the thickness of the first layer comprising silver to the thickness of the second layer comprising silver is at least 1.15.

4. The IG window unit of claim 1, wherein the ratio of the thickness of the first layer comprising silver to the thickness of the second layer comprising silver is at least 1.17.

5. The IG window unit of claim 1, wherein the coating includes only two infrared (IR) reflecting layers comprising silver.

6. The IG window unit of claim 1, wherein the IG window unit has a selectivity of at least 1.80.

7. The IG window unit of claim 1, wherein the IG window unit has a selectivity of at least 1.85.

8. The IG window unit of claim 1, wherein the IG window unit has a selectivity of at least 1.90.

9. The IG window unit of claim 1, wherein the IG window unit has a selectivity of at least 1.95.

10. The IG window unit of claim 1, wherein the IG window unit has a SF of no greater than 27.0.

11. The IG window unit of claim 1, wherein the IG window unit has a SF of no greater than 26.0.

12. The IG window unit of claim 1, wherein the IG window unit has an outside reflective a* value, at a normal viewing angle, of from −4 to +2.

13. The IG window unit of claim 1, wherein the IG window unit has an outside reflective a* value, at a normal viewing angle, of from −2.5 to +1.

14. The IG window unit of claim 1, wherein the coating has a sheet resistance ($R_s$) of no greater than 3.0 ohms/square.

15. The IG window unit of claim 1, wherein the coating has a sheet resistance ($R_s$) of no greater than 2.0 ohms/square.

16. The IG window unit of claim 1, wherein the glass substrate supporting the coating is not heat treated with the coating thereon.

17. The IG window unit of claim 1, wherein the IG window unit has a visible transmission of from about 35 to 65%.

18. The IG window unit of claim 1, wherein the IG unit has an outside a* value which does not change by more than 3.5 given a viewing angle shift from 0 to 45 degrees.

19. The IG window unit of claim 1, wherein the IG unit has an outside a* value which does not change by more than 2.5 given a viewing angle shift from 0 to 45 degrees.

20. The IG window unit of claim 1, wherein outside reflective a* and b* of the IG window unit do not change by more than 3.5 given a viewing angle shift from 0 to 45 degrees.

21. The IG window unit of claim 1, wherein the coating comprises at least the following layers from the substrate which supports the coating, outwardly:
   a first dielectric layer;
   a first contact layer;

said first layer comprising silver;
a second contact layer comprising Ni and/or Cr;
a second dielectric layer;
a third contact layer comprising zinc oxide;
said second layer comprising silver; and
a fourth contact layer; and
an overcoat layer.

22. The IG window unit of claim 21, wherein the first and second contact layers are metallic, and the third and fourth contact layers each comprise a metal oxide.

23. The IG window unit of claim 21, wherein one or both of the first and second contact layers is composed of metallic NiCr, and both of the third and fourth contact layers comprise a metal oxide.

24. The IG window unit of claim 23, wherein the third contact layer comprises zinc oxide, and the fourth contact layer comprises an oxide of Ni and/or Cr.

25. The IG window unit of claim 21, wherein each of the first and second contact layers are composed of metallic NiCr, the third contact layer comprises zinc oxide, and the fourth contact layer comprises an oxide of NiCr.

26. The IG window unit of claim 21, wherein the overcoat layer comprises silicon nitride or zirconium oxide.

27. The IG window unit of claim 21, further comprising a layer comprising tin oxide between the fourth contact layer and the overcoat layer.

28. The IG window unit of claim 21, wherein the first dielectric layer comprises titanium oxide and/or silicon nitride.

29. The IG window unit of claim 21, wherein the second dielectric layer comprises tin oxide and/or silicon nitride.

30. An insulating glass (IG) window unit comprising:
first and second glass substrates, and a coating supported by one of the substrates, the coating comprising:
first and second IR reflecting layers with at least one dielectric layer therebetween, the first IR reflecting layer being located between the glass substrate supporting the coating and the second IR reflecting layer;
a first contact layer located under and contacting the first IR reflecting layer, a second contact layer located over and contacting the first IR reflecting layer, a third contact layer located under and contacting the second IR reflecting layer, and a fourth contact layer located over and contacting the second IR reflecting layer;
wherein the third and/or fourth contact layer is more oxidized than is the first and/or second contact layer;
wherein the IG window unit has a selectivity ($T_{vis}$/SF) of at least 1.75, and/or a solar factor (SF) of no greater than 27.5; and
wherein a ratio ($T_{first}/T_{second}$) of the thickness of the first IR reflecting layer to the thickness of the second IR reflecting layer is at least 1.05.

31. The IG window unit of claim 30, wherein the first and second contact layers are metallic, and the third and fourth contact layers each comprise a metal oxide.

32. The IG window unit of claim 30, wherein the first and/or second contact layer is composed of NiCr, and the third and/or fourth contact layer is composed of an oxide of NiCr.

33. The IG window unit of claim 30, wherein a ratio of the thickness of the first IR reflecting layer to the thickness of the second IR reflecting layer is at least 1.15.

34. The IG window unit of claim 30, wherein each of the first and second IR reflecting layers comprises silver.

35. The IG window unit of claim 30, wherein the coating includes only two infrared (IR) reflecting layers.

36. The IG window unit of claim 30, wherein the IG window unit has a selectivity of at least 1.80.

37. The IG window unit of claim 30, wherein the IG window unit has a selectivity of at least 1.85.

38. The IG window unit of claim 30, wherein the IG window unit has a selectivity of at least 1.90.

39. The IG window unit of claim 30, wherein the IG window unit has a SF of no greater than 27.0.

40. The IG window unit of claim 30, wherein the IG window unit has a SF of no greater than 26.0.

41. The IG window unit of claim 30, wherein the IG window unit has an outside reflective a* value, at a normal viewing angle, of from −3 to +2.

42. The IG window unit of claim 30, wherein the IG window unit has an outside reflective a* value, at a normal viewing angle, of from −2.5 to +1.

43. The IG window unit of claim 30, wherein the coating has a sheet resistance ($R_s$) of no greater than 3.0 ohms/square.

44. The IG window unit of claim 30, wherein the glass substrate supporting the coating is not heat treated with the coating thereon.

45. The IG window unit of claim 30, wherein the IG window unit has a visible transmission of from about 40 to 60%.

46. The IG window unit of claim 30, wherein the IG unit has an outside a* value which does not change by more than 3.5 given a viewing angle shift from 0 to 45 degrees.

47. The IG window unit of claim 30, wherein the IG unit has an outside a* value which does not change by more than 2.5 given a viewing angle shift from 0 to 45 degrees.

48. A coated article including a coated supported by the glass substrate, the coating comprising
first and second IR reflecting layers with at least one dielectric layer therebetween,
wherein the coated article is characterized by one or both of: a) a selectivity ($T_{vis}$/SF) of at least 1.80, in combination with a solar factor (SF) of no greater than 27.5; and/or b) a ratio ($T_{first}/T_{second}$) of the thickness of the first IR reflecting layer to the thickness of the second IR reflecting layer being at least 1.05; and
wherein a layer sequence comprising first, second and third layers respectively comprising titanium oxide, silicon nitride, and NiCr, is provided between the glass substrate and the lower of the first and second IR reflecting layers.

49. A coated article including a coated supported by the glass substrate, the coating comprising
first and second IR reflecting layers with at least one dielectric layer therebetween,
wherein the coated article is characterized by both of: a) a selectivity ($T_{vis}$/SF) of at least 1.80, in combination with a solar factor (SF) of no greater than 27.5; and b) a ratio ($T_{first}/T_{second}$) of the thickness of the first IR reflecting layer to the thickness of the second IR reflecting layer being at least 1.05.

50. The coated article of claim 49, wherein the coated article has a visible transmission of from about 40-60%.

51. The coated article of claim 48, wherein each of the IR reflecting layers comprises silver, and wherein the coating has only two IR reflecting layers comprising silver.

52. The coated article of claim 49, wherein an outside or glass side reflective a* value of the coated article does not change by more than 3.5 given a viewing angle shift from 0 to 45 degrees.

53. The coated article of claim 48, wherein the coated article has an outside reflective a* value, at a normal viewing angle, of from −2.5 to +1.

54. An insulating glass (IG) window unit including first and second glass substrates, and a coating supported by one of the substrates, the coating comprising:

first and second layers comprising silver with at least one dielectric layer therebetween, the first layer comprising silver being located between the glass substrate supporting the coating and the second layer comprising silver;

wherein a ratio ($T_{first}/T_{second}$) of the thickness of the first layer comprising silver to the thickness of the second layer comprising silver is at least 1.05;

wherein the IG window unit has a visible transmission of from about 35 to 65%; and wherein the IG window unit has a selectivity ($T_{vis}SF$) of at least 1.90.

55. The IG window unit of claim 54, wherein the IG window unit has a selectivity of at least 1.95.

56. An insulating glass (IG) window unit including first and second glass substrates, and a coating supported by one of the substrates, the coating comprising:

first and second layers comprising silver with at least one dielectric layer therebetween, the first layer comprising silver being located between the glass substrate supporting the coating and the second layer comprising silver;

wherein a ratio ($T_{first}/T_{second}$) of the thickness of the first layer comprising silver to the thickness of the second layer comprising silver is at least 1.05;

wherein the IG window unit has a visible transmission of from about 35 to 65%; and wherein the IG window unit has a SF of no greater than 27.0.

57. The IG window unit of claim 56, wherein the IG window unit has an outside reflective a* value, at a normal viewing angle, of from −2.5 to +1.

58. The IG window unit of claim 21, wherein one or both of the first and second contact layers is composed of metallic NiCr or a nitride of NiCr.

* * * * *